United States Patent
Nakayama et al.

(10) Patent No.: US 11,920,685 B2
(45) Date of Patent: Mar. 5, 2024

(54) VALVE DEVICE

(71) Applicant: FUTABA INDUSTRIAL CO., LTD., Okazaki (JP)

(72) Inventors: Takenori Nakayama, Okazaki (JP); Hiroaki Yokoyama, Okazaki (JP); Yuta Asano, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 17/987,337

(22) Filed: Nov. 15, 2022

(65) Prior Publication Data
US 2023/0167907 A1 Jun. 1, 2023

(30) Foreign Application Priority Data

Nov. 26, 2021 (JP) .................................. 2021-192372

(51) Int. Cl.
*F16K 15/03* (2006.01)

(52) U.S. Cl.
CPC .................................. *F16K 15/033* (2013.01)

(58) Field of Classification Search
CPC .............................. F16K 15/03; F16K 15/033
See application file for complete search history.

(56) References Cited

U.S. PATENT DOCUMENTS

| | | | | |
|---|---|---|---|---|
| 3,612,097 | A | * | 10/1971 | Prince .................... F16K 15/033 251/363 |
| 4,508,139 | A | * | 4/1985 | Teumer .................. F16K 15/033 251/363 |
| 4,693,269 | A | * | 9/1987 | Yamada ................ F16K 15/063 137/514.7 |
| 10,787,993 | B2 | | 9/2020 | Karasawa et al. |
| 2016/0102770 | A1 | | 4/2016 | Wakatsuki et al. |
| 2019/0032598 | A1 | | 1/2019 | Karasawa et al. |
| 2019/0301769 | A1 | * | 10/2019 | Kanematsu ............... F24F 7/10 |

FOREIGN PATENT DOCUMENTS

| | | |
|---|---|---|
| JP | 2005171784 A | 6/2005 |
| JP | 2016-079807 A | 5/2016 |
| JP | 2017-133665 A | 8/2017 |

OTHER PUBLICATIONS

English translation of the Notice of Reasons for Refusal dated Jan. 9, 2024 in corresponding Japanese Patent Application No. 2022-181950.

* cited by examiner

*Primary Examiner* — Kevin F Murphy
(74) *Attorney, Agent, or Firm* — David D. Brush; Westman, Champlin & Koehler, P.A.

(57) ABSTRACT

A valve device includes a rotation shaft, a valve body, and a biasing portion. The valve body is configured to be rotationally displaceable about the rotation shaft between a closed position and an open position. The biasing portion biases the valve body so as to cause the valve body to approach the closed position. The valve body includes an upstream wall arranged in a position upstream of the rotation shaft in a flow direction of the fluid when the valve body is in the closed position. The valve body includes a rotation end, which is an end distal from the rotation shaft and moves downstream in the flow direction of the fluid in response to a displacement of the valve body from the closed position to the open position, and the rotation end is shaped to project upstream when the valve body is in the closed position.

6 Claims, 11 Drawing Sheets

VALVE DEVICE

CROSS-REFERENCE TO RELATED APPLICATIONS

This application claims the benefit of Japanese Patent Application No. 2021-192372 filed on Nov. 26, 2021 with the Japan Patent Office, the entire disclosure of which is incorporated herein by reference.

BACKGROUND

The present disclosure relates to a valve device to be provided in a pipe through which a fluid flows.

There is a conventionally known valve device to be provided in an exhaust gas pipe. For example, in a valve device disclosed in Patent Document 1 (Japanese Unexamined Application Publication No. 2016-79807), a valve body to open and close a pipe, through which exhaust gas from an vehicle engine flows, is configured integrally with a rotation shaft that is provided to penetrate the pipe. A link arm is provided to a portion of the rotation shaft exposed outside the pipe. The valve body is biased to rotate toward a closed position by means of a spring coupled to the link arm. The closed position here means a rotational position of the valve body at which an opening degree of the valve device is minimum. In another example, a valve device disclosed in Patent Document 2 (Japanese Unexamined Application Publication No. 2017-133665) is configured to close a passage on a downstream side or an upstream side of a shaft of a valve body. In this valve device, a rotation angle of the valve body is controlled by an external drive source.

SUMMARY

In a structure, as in the aforementioned Patent Document 1, where the valve body is biased toward the closed position using a spring or the like, it is configured such that a biasing force becomes smaller as the valve body is closer to the closed position, for the purpose of increasing the opening degree of the valve device as an exhaust gas flow rate becomes higher. Then, as the valve body becomes closer to the open position and the opening degree becomes larger, deformation of the spring becomes greater and the biasing force of the spring becomes greater.

When the valve body has an angle close to the right angle with respect to a flow direction of the exhaust gas, such as a case where the valve body is in the closed position, the valve body can efficiently receive a force from the exhaust gas. However, when the valve body rotates and has a smaller inclination angle with respect to the flow direction, the valve body is less likely to receive a force from the exhaust gas. In other words, there is a problem that when the valve body is greatly inclined and the opening degree becomes larger, the biasing force by means of the spring becomes greater and the force is received from the exhaust gas less efficiently, and thus it is difficult to control the opening degree of the valve device based on the exhaust gas flow rate.

In one aspect of the present disclosure, it is desirable to efficiently receive a force from a fluid when an opening degree of a valve device is large.

A valve device in one aspect of the present disclosure is a valve device to be arranged in a pipe through which a fluid flows, and comprises a rotation shaft, a valve body, and a biasing portion. The valve body is configured to be rotationally displaceable about the rotation shaft between a closed position in which a blocking degree of the pipe by the valve body is relatively large, and an open position in which the blocking degree is relatively small. The biasing portion biases the valve body so as to cause the valve body to approach the closed position. The valve body comprises an upstream wall arranged in a position upstream of the rotation shaft in a flow direction of the fluid when the valve body is in the closed position. The valve body comprises a rotation end, which is an end distal from the rotation shaft and is configured to move downstream in the flow direction of the fluid in response to a displacement of the valve body from the closed position to the open position, and the rotation end is shaped to project upstream when the valve body is in the closed position.

With this configuration, the valve body receives a smaller rotational force from the fluid when the valve body is in the closed position, while when the valve body is displaced from the closed position toward the open position, the valve body efficiently receives a force from the fluid and thus achieves a large rotational force toward the open position. Therefore, it is facilitated to maintain a state with a large opening degree of the valve device, to thereby suitably control a flow rate of the fluid.

In the above-described valve device, the rotation end in the valve body may be located in the upstream wall. A portion of the upstream wall located on an opposite end side to the rotation end may comprise a flat-shaped surface configured to face upstream when the valve body is in the closed position. This configuration facilitates the valve body to receive a rotational force in a direction of moving the valve body toward the closed position when the valve body is in the closed position (i.e., a rotational force to maintain the valve body in the closed position). Therefore, it is possible, when the valve body is in the closed position, to reduce a rotational displacement of the valve body toward the open position caused by a small flow rate of the fluid.

In the above-described valve device, the rotation shaft may be arranged in a position radially spaced from a central axis of the pipe. The upstream wall may be configured such that the rotation end and the rotation shaft are located opposite to each other with respect to the central axis of the pipe when the valve body is in the closed position. With this configuration, when the upstream wall is pushed by the fluid, a large area serves to generate a force toward the open position. Therefore, it is possible to suitably generate a rotational force from the closed position toward the open position when the upstream wall is pushed by the fluid.

In the above-described valve device, the rotation shaft may be non-rotatably fixed directly or indirectly to the pipe. The biasing portion may be a spring member biasing the valve body by an elastic force, the biasing portion being arranged inside the pipe, and having one end coupled to the rotation shaft and the other end coupled to the valve body. This configuration allows the biasing portion to be arranged inside the pipe, without requiring a space for arranging the biasing portion outside the pipe. Since the biasing portion is coupled to the rotation shaft and the valve body, the biasing portion is located in a vicinity of the valve body, and size reduction of a portion inside the pipe can be achieved. The biasing portion may also be arranged inside the valve body.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
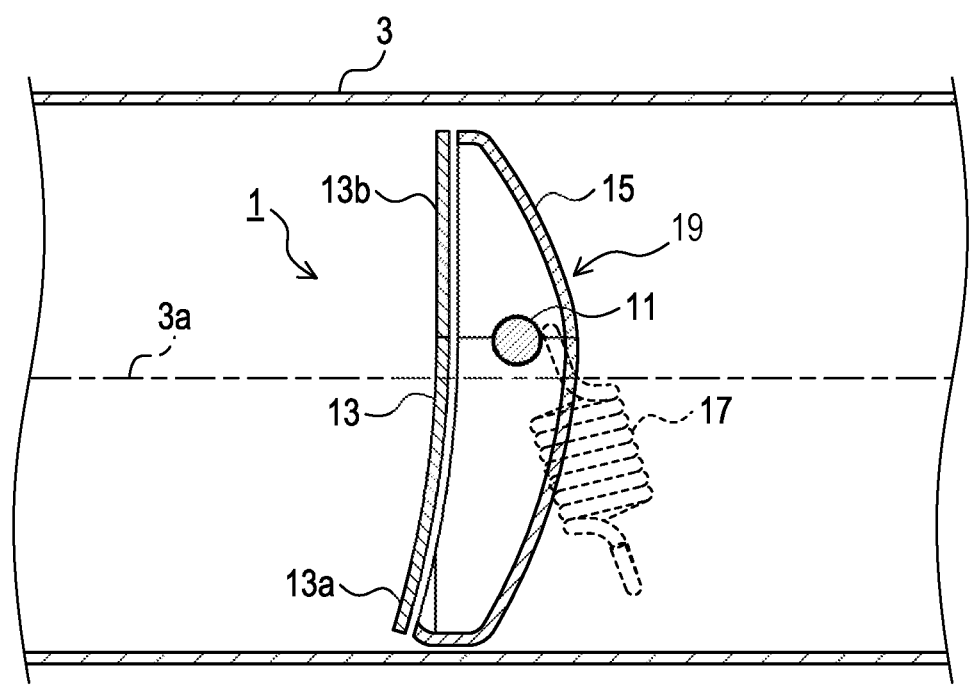
FIG. 1 is a sectional view of a valve device of a first embodiment.

Hereinafter, embodiments of the present disclosure will be described with reference to the drawings. Embodiments of the present disclosure are not at all limited to the embodiments below, but may be in various forms within the technical scope of the present disclosure.

1. First Embodiment

[1-1. Overall Configuration]

A valve device 1 of a first embodiment is a valve device to be arranged in a pipe 3 through which a fluid flows, as shown in FIG. 1 and FIGS. 2A-2H. In the present embodiment, the pipe 3 is used as an exhaust pipe through which exhaust gas from an engine of a vehicle flows. Hereinafter, a description will be given using exhaust gas as an example of the fluid. The valve device 1 may be provided at any position of the exhaust pipe, and may be provided, for example, in an inner pipe of a muffler installed in a flow path of the exhaust gas in the vehicle. The pipe 3 is, for example, a substantially linear cylindrical member. Hereinafter, a line passing through an approximate center of a cross section of the pipe 3 in a plane orthogonal to a flow direction of the exhaust gas is referred to as a central axis 3a. The valve device 1 is configured to adjust an opening degree of the flow path formed by the pipe 3, and comprises a rotation shaft 11, an upstream wall 13, a support body 15, and a biasing portion 17. The upstream wall 13 and the support body 15 form a valve body 19.

The rotation shaft 11 is a rod-shaped member to be fixed to the pipe 3, and serves as a rotation center of the valve body 19. The rotation shaft 11 is not limited to any particular configuration as long as the valve body 19 is configured to be rotationally displaceable about the rotation shaft 11. The rotation shaft 11 is arranged, for example as shown in FIG. 2H, inside the pipe 3 so as to penetrate a wall of the pipe 3. As shown in FIG. 1, the rotation shaft 11 is arranged in a position radially spaced from the central axis 3a of the pipe 3.

The upstream wall 13 is a member to adjust the opening degree of the flow path inside the pipe 3, and has a substantially disk shape as shown in FIGS. 2E-2H. The upstream wall 13 is a wall member forming an upstream surface of the valve body 19 in a flowing direction of the exhaust gas. The upstream wall 13 is provided to be rotatable about the rotation shaft 11. A description will be given of a rotational motion of the upstream wall 13 with reference to FIGS. 2A-2H. FIGS. 2A-2D are each a sectional view along a plane passing through the central axis 3a of the pipe 3 and orthogonal to the rotation shaft 11. FIGS. 2E-2H are views of the valve device 1 when viewed from an upstream side of the pipe 3.

Figure 2A:
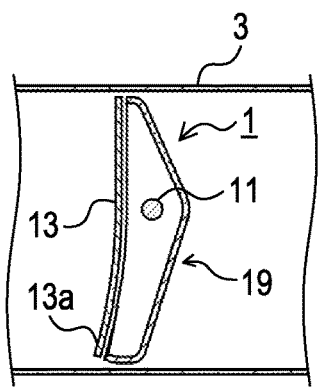
FIG. 2A is a sectional view of the valve device of the first embodiment in a closed position.
Figure 2E:
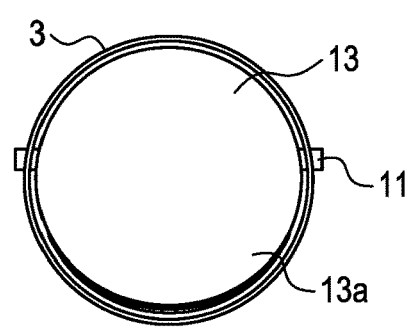
FIG. 2E is a view of the valve device of the first embodiment when viewed from an upstream side, and corresponding to FIG. 2A.

FIG. 2A shows a case where the valve body 19 is in a closed position. The closed position is a position in which a blocking degree of the pipe 3 by the valve body 19 is relatively large. The blocking degree here means a degree indicating difficulty in flow of the exhaust gas. The closed position in the present embodiment is a position in which flow of the exhaust gas is most difficult within a rotationally displaceable range of the valve body 19. When the valve body 19 is in the closed position shown in FIG. 2A, the flow path is substantially blocked by the upstream wall 13 as shown in FIG. 2E.

Figure 2B:
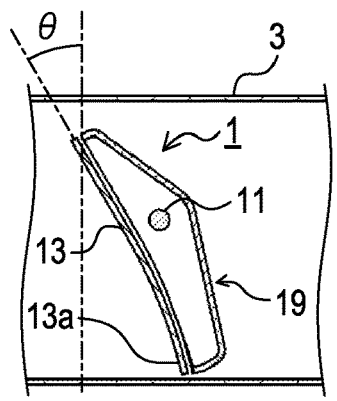
FIG. 2B is a sectional view of the valve device of the first embodiment in a state of being rotated by 30°.

FIG. 2B shows a case where the valve body 19 is rotated and in a 30 degree inclined position. An inclination angle here is an angle θ formed by a plane orthogonal to the flow direction of the exhaust gas and a main surface of the upstream wall 13, when the valve body 19 is projected on a plane orthogonal to the rotation shaft 11 (i.e., when viewed from a viewpoint shown in FIG. 2B). The main surface of the upstream wall 13 here may be a plane on an assumption that a later-described rotation end 13a has no projection (curve). Alternatively, in case of assuming the upstream wall 13 as a substantially flat surface, the main surface may be the substantially flat surface. The inclination angle is a value suggesting an approximate inclination state of the valve body 19.

Figure 2F:
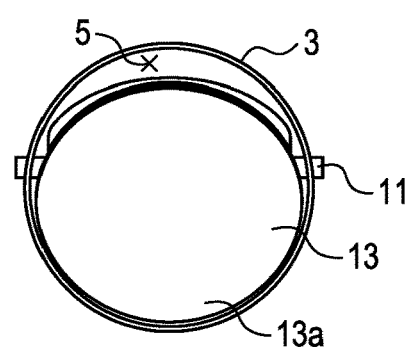
FIG. 2F is a view of the valve device of the first embodiment when viewed from the upstream side and corresponding to FIG. 2B.

When the valve body 19 is in an inclined state, a space 5 that allows movement of the exhaust gas in the flow path gradually becomes larger as shown in FIG. 2F, and the exhaust gas flows more easily than in the closed position. In the closed position shown in FIG. 2A, the inclination angle is 0°.

Figure 2C:
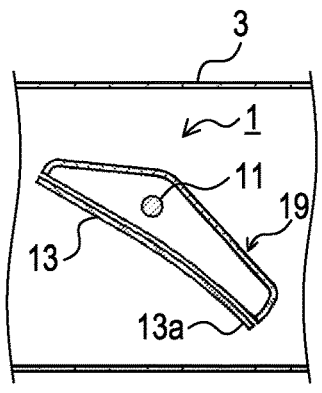
FIG. 2C is a sectional view of the valve device of the first embodiment in a state of being rotated by 60°.
Figure 2G:
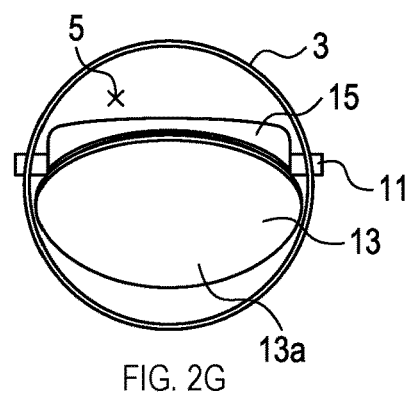
FIG. 2G is a view of the valve device of the first embodiment when viewed from the upstream side and corresponding to FIG. 2C.

FIG. 2C shows a case where the valve body 19 is rotated and in a 60 degree inclined position. In this inclined state, the space 5 is further large as shown in FIG. 2G, and the exhaust gas flows much more easily.

Figure 2D:
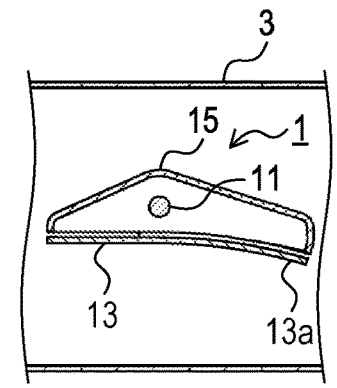
FIG. 2D is a sectional view of the valve device of the first embodiment in an open position.
Figure 2H:
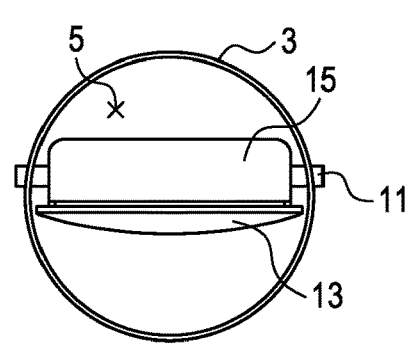
FIG. 2H is a view of the valve device of the first embodiment when viewed from the upstream side and corresponding to FIG. 2D.

FIG. 2D shows a case where the valve body 19 is in an open position. The open position is a position in which the above-described blocking degree is relatively small. When the valve body 19 is in the open position, the valve body 19 is inclined by 90°. In this inclined state, the space 5 is largest, i.e., the opening degree is largest as shown in FIG. 2H, and the exhaust gas passes through the valve device 1 most smoothly.

The valve body 19 is rotationally displaceable between the closed position and the open position. The valve body 19 is configured to be non-displaceable except between the closed position and the open position by means of a not-shown stopper.

As shown in FIG. 1 and FIG. 2A, the upstream wall 13 is arranged in a position upstream of the rotation shaft 11 in the flow direction of the fluid, when the valve body 19 is in the above-described closed position. More specifically, the upstream wall 13 is arranged upstream of the rotation center of the rotation shaft 11. Hereinafter, a state in which the upstream wall 13 is arranged upstream of the rotation shaft 11 is also referred to as "offset".

An end of the upstream wall 13, which is distal from the rotation shaft 11 and moves downstream in the flow direction in response to a displacement of the valve body 19 from the closed position to the open position, is referred to as a "rotation end 13a". When the valve body 19 is divided into two areas with respect to the rotation shaft 11 viewed from the flow direction of the exhaust gas, the rotation end 13a is an end of one of the areas of the valve body 19 having a longer length from the rotation shaft 11 to the end. In this case, the upstream wall 13 is shaped such that the rotation end 13a is curved upstream when the valve body 19 is in the closed position. More specifically, a portion of the upstream wall 13 closer to the rotation end 13a with respect to the central axis 3a is gently curved upstream toward the rotation end 13a, and the rotation end 13a is positioned most upstream. A portion 13b opposite to the rotation end 13a with respect to the rotation shaft 11 is flat-shaped. Specifically, the portion 13b has a flat surface configured to face upstream when the valve body 19 is in the closed position.

The upstream wall 13 is configured such that the rotation end 13a and the rotation shaft 11 are positioned opposite to each other with respect to the central axis 3a when the valve body 19 is in the closed position.

Hereinafter, a rotational direction of the valve body 19 from the open position toward the closed position is referred to as a closing direction, and a rotational direction of the valve body 19 from the closed position toward the open position is referred to as an opening direction. As the valve body 19 approaches the closed position, the valve device 1 has a decreased opening degree and an increased blocking degree. Hereinafter, "upstream" and "downstream" mean upstream and downstream in the flow direction of the exhaust gas.

The support body 15 is a container-shaped member fixed on a surface of the upstream wall 13, which is on a downstream side in the closed position. The rotation shaft 11 is fixed to the support body 15. The upstream wall 13 is mounted to the rotation shaft 11 through the support body 15.

The biasing portion 17 biases the valve body 19 so as to cause the valve body 19 to approach the closed position. The biasing portion 17 is a spring member biasing the valve body 19 by an elastic force. The biasing portion 17 is arranged outside the pipe 3, having one end coupled to a fixing portion, such as a side surface of the pipe 3, and the other end coupled to the rotation shaft 11. The biasing portion 17 applies a rotational force to the rotation shaft 11 so as to cause the valve body 19 to approach the closed position.

[1-2. Rotation of Valve Body]

The biasing portion 17 is extended and longer than its natural length regardless of a rotation angle of the valve body 19, and generates a restoring force to contract the spring member. When the valve body 19 is in the closed position, the biasing portion 17 has a minimum extension and generates a minimum restoring force. As the valve body 19 approaches the open position, the biasing portion 17 has a greater extension and generates a greater restoring force. Thus, the restoring force of the biasing portion 17 generates torque to rotate the valve body 19 toward the closed position (in other words, in the closing direction). The valve body 19 rotates in the opening direction by the exhaust gas flowing in the pipe 3.

As described above, the rotation shaft 11 is arranged in the position radially spaced from the central axis 3a. Thus, when the upstream wall 13 is projected on a plane having the central axis 3a of the pipe 3 as a normal, an area on a side of the rotation end 13a is greater. As a result, the side of the rotation end 13a receives a greater part of the rotational force by the exhaust gas, and the valve body 19 as a whole receives the rotational force such that the rotation end 13a moves rearward. In a case where the rotational force is greater than the force in the closing direction by the biasing portion 17, the valve body 19 opens in the opening direction.

[1-3. Differences in Rotational Force Depending on Shape of Valve Body]

The upstream wall 13 is located offset upstream of the rotation shaft 11 and the rotation end 13a projects upstream in the closed position. In other words, the rotation end 13a is curved upstream. A description will be given of differences in the rotational force obtained by this configuration.

Figure 3A:
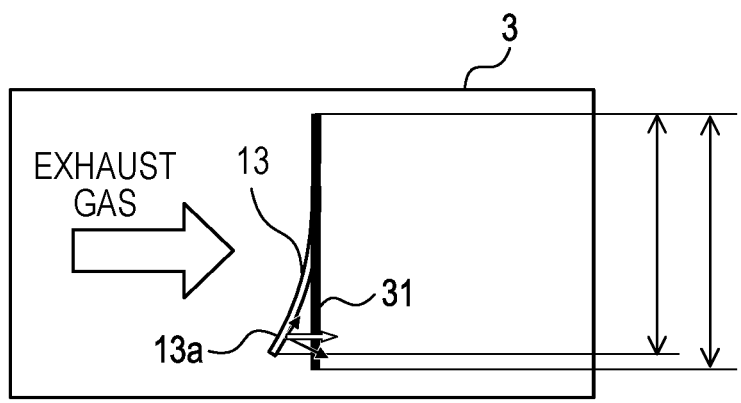
FIG. 3A is a side view illustrating an effect of a rotation end being curved upstream.
Figure 3B:
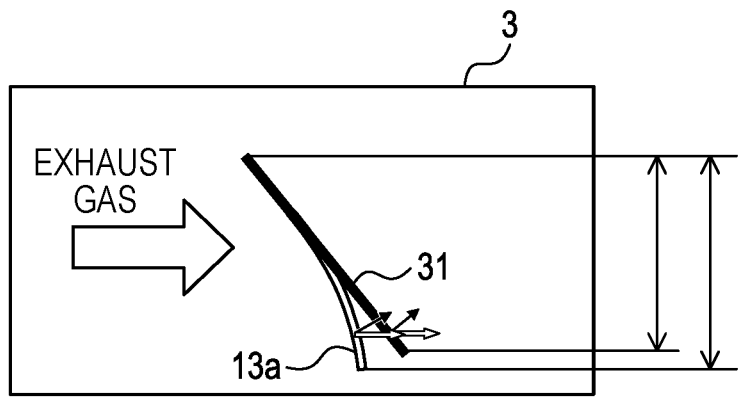
FIG. 3B is a side view illustrating the effect of the rotation end being curved upstream.
Figure 4A:
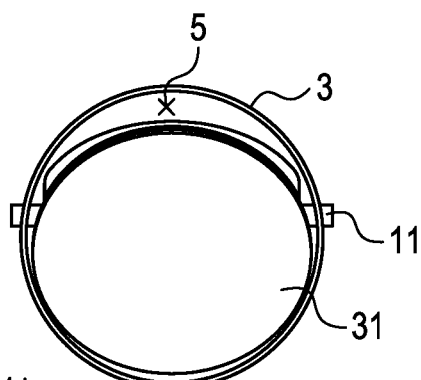
FIG. 4A is a view of a valve device of a first comparative example when viewed from an upstream side in a case where a valve body has an inclination angle of 30°.
Figure 4C:
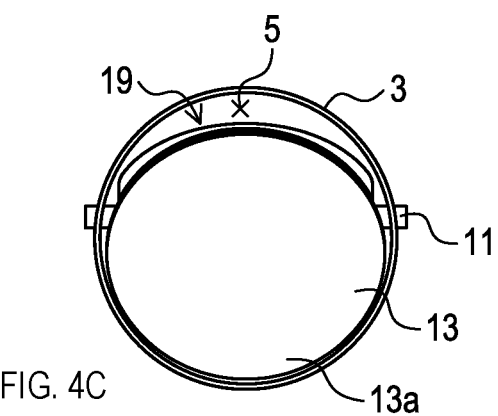
FIG. 4C is a view of the valve device of the first embodiment when viewed from the upstream side in a case where a valve body has an inclination angle of 30°.
Figure 4B:
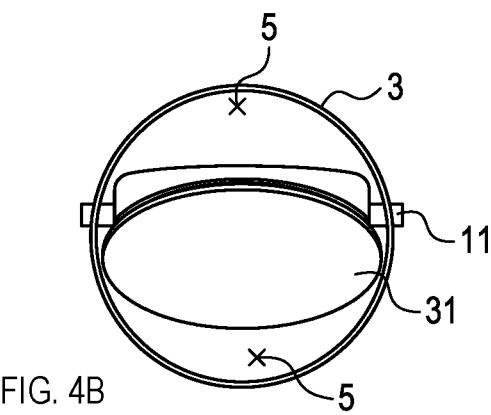
FIG. 4B is a view of the valve device of the first comparative example when viewed from the upstream side in a case where the valve body has an inclination angle of 60°.
Figure 4D:
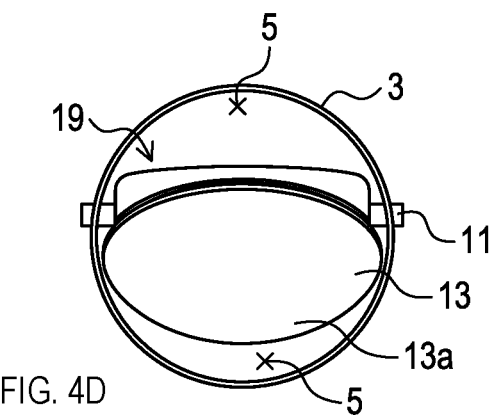
FIG. 4D is a view of the valve device of the first embodiment when viewed from the upstream side in a case where the valve body has an inclination angle of 60°.

Referring to FIGS. 3A and 3B, differences by the curve of the rotation end 13a will be described. For comparison, a flat-shaped upstream wall 31 without a curve is also shown as a first comparative example.

As shown in FIG. 3A, in the closed position, the upstream wall 13 has a smaller rate of blocking the flow path of the pipe 3 than that of the upstream wall 31 of the first comparative example. Thus, in the closed position, the upstream wall 13 receives a smaller force from the exhaust gas.

On the other hand, when the valve body 19 is rotated in the opening direction as shown in FIG. 3B, the rotation end 13a is positioned closer to a wall surface of the pipe 3 than an end of the upstream wall 31 of the first comparative example, and the upstream wall 13 has a greater rate of blocking the flow path than that of the upstream wall 31 of the first comparative example. Thus, when the valve body 19 is displaced in the opening direction, the upstream wall 13 receives a greater force from the exhaust gas. As shown in FIGS. 4A-4D, the upstream wall 13 has a greater rate of blocking the flow path than that of the upstream wall 31 of the first comparative example in both cases where the inclination angle is 30° and 60°.

As a surface of the upstream wall 13 hit by the exhaust gas is closer to a state perpendicular to the flow direction (a direction of the central axis 3a), a pushing force of the exhaust gas becomes the rotational force more efficiently. In FIG. 3A, the upstream wall 13 receives a smaller force from the exhaust gas than the upstream wall 31 of the first comparative example does. In FIG. 3B, the upstream wall 13 receives a greater force from the exhaust gas than the upstream wall 31 of the first comparative example does. Accordingly, the upstream wall 13 receives a smaller force from the exhaust gas in the closed position, while when the valve body 19 is rotated, the upstream wall 13 receives a greater force from the exhaust gas.

Figure 5A:
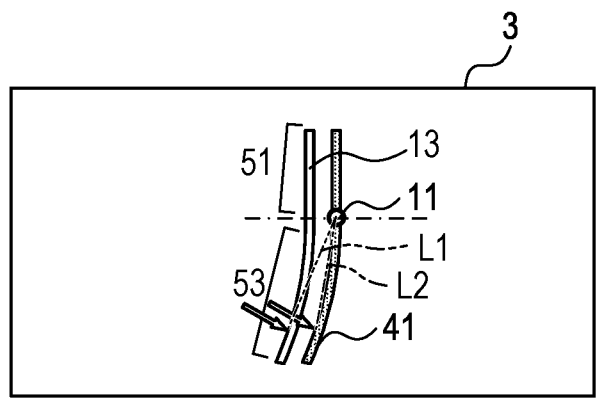
FIG. 5A is a side view illustrating an effect of an upstream wall being offset upstream of a rotation shaft.
Figure 5B:
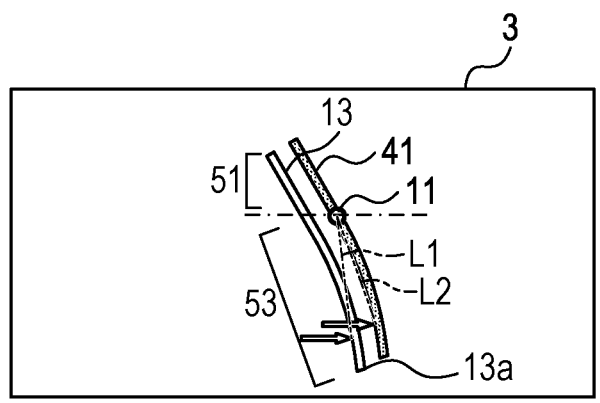
FIG. 5B is a side view illustrating the effect of the upstream wall being offset upstream of the rotation shaft.

Referring to FIGS. 5A and 5B, effects of the offset of the upstream wall 13 will be described. As a second comparative example, an upstream wall 41, which has the same shape as that of the upstream wall 13 but is not offset from the rotation shaft 11, is also shown. As shown in FIG. 5A and FIG. 5B, in comparison between respective distances from the rotation shaft 11 to the same positions of the respective upstream walls (positions of the respective upstream walls indicated by arrows in the figures), a distance L1 for the upstream wall 13 is greater than a distance L2 for the upstream wall 41 of the second comparative example due to the offset of the upstream wall 13. Specifically, when a pushing force is applied by the exhaust gas, the upstream wall 13 having a greater distance from the point of effort to the fulcrum (the rotation shaft 11) can provide greater torque on the valve body by receiving the force from the exhaust gas. As a result, the valve body 19 is more likely to rotate in the opening direction.

In each of the upstream walls, an area positioned opposite to the rotation end 13a with respect to the rotation shaft 11 is defined as a first area 51, and an area positioned on a side of the rotation end 13a is defined as a second area 53. In a closed state as shown in FIG. 5A, the upstream wall 13 and the upstream wall 41 of the second comparative example show no difference in terms of a ratio between the first area 51 and the second area 53. However, when the valve body 19 is rotated in the opening direction as shown in FIG. 5B, the first area 51 is decreased and the second area 53 is increased in the upstream wall 13. In this case, the first area 51 is a portion to generate the rotational force in the closing direction by the exhaust gas, while the second area 53 is a portion to generate the rotational force in the opening direction. Thus, when the valve body 19 is displaced in the opening direction, the upstream wall 13 in a wider area thereof can use the force received from the exhaust gas as the rotational force in the opening direction.

The difference in the rotational force received by the upstream walls as described using FIGS. 5A and 5B occurs also in a case where the upstream wall 41 of the second comparative example has a flat shape similar to the upstream wall 31 of the first comparative example.

For the reasons described above, the upstream wall 13 receives from the exhaust gas a smaller rotational force in the closed position, and receives from the exhaust gas a greater rotational force when the valve body 19 is rotationally displaced in the opening direction.

[1-4. Effects]

(1a) The upstream wall 13 in the valve device 1 of the first embodiment is arranged in a position upstream of the rotation center formed by the rotation shaft 11 and the rotation end 13a is shaped to project upstream when the valve body 19 is in the closed position. Thus, the rotational force received from the exhaust gas is small when the valve body 19 is in the closed position, and the force can be received efficiently from the exhaust gas when the valve body 19 is displaced from the closed position toward the open position. Accordingly, it is facilitated to maintain a large opening degree of the valve device 1, to thereby control the exhaust gas flow rate suitably.

(1b) In the valve device 1, the portion 13b in the upstream wall 13 opposite to the rotation end 13a has a flat surface facing upstream. Thus, when the valve body 19 is in the closed position, the above-described portion 13b is orthogonal to the central axis 3a, thereby receiving pressure of the exhaust gas efficiently. As a result, it is possible to limit rotational displacement of the valve body 19 toward the open position by a low exhaust gas flow rate when the valve body 19 is in the closed position.

(1c) In the valve device 1, the rotation shaft 11 is arranged in the position radially spaced from the central axis 3a of the pipe 3. Also, the upstream wall 13 is configured such that the rotation end 13a is arranged in a position opposite to the rotation shaft 11 with respect to the central axis 3a when the valve body 19 is in the closed position. Accordingly, it is possible to surely use the force of the exhaust gas as the rotational force in the opening direction.

2. Second Embodiment

Since a second embodiment has the same basic configurations as those of the first embodiment, common configurations will not be further described, and differences will be mainly described. The same reference numerals indicate the same respective configurations as in the first embodiment, and the preceding descriptions should be referred to.

Figure 6:
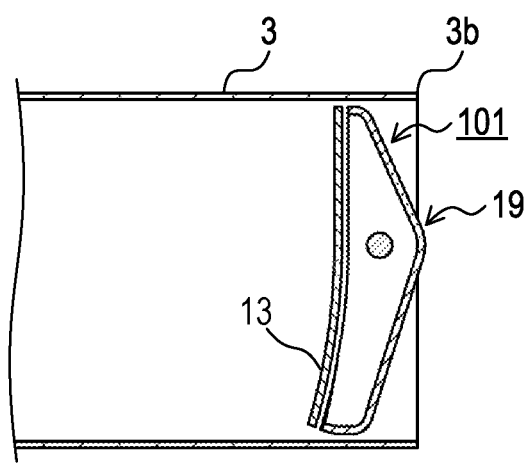
FIG. 6 is a sectional view of a valve device of a second embodiment.
Figure 7A:
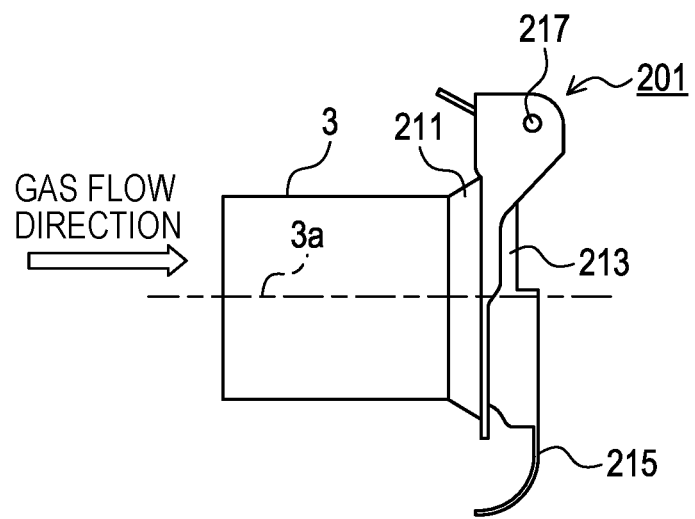
FIG. 7A is a side view showing a valve device of a third embodiment.
Figure 7B:
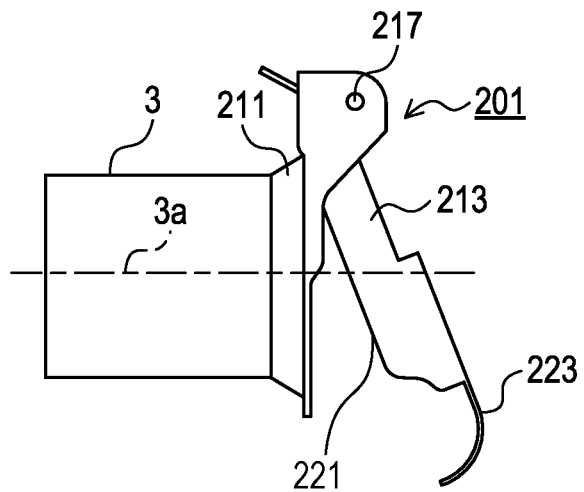
FIG. 7B is a side view showing the valve device of the third embodiment.

In the first embodiment, a configuration is exemplified in which the valve device 1 is provided inside the pipe 3. In contrast, in the second embodiment, a valve device 101 is arranged in a vicinity of an end 3b of the pipe 3 inside the pipe 3 as shown in FIG. 6.

In the valve device 101, the upstream wall 13 is configured such that the upstream wall 13 as a whole is located inside the pipe 3 when the valve body 19 is in the closed position, while when the valve body 19 is in the open position, a part of the upstream wall 13 is located outside the end 3b of the pipe 3. With such configuration, it is possible to adjust the opening degree of the valve device 101 at the end 3b of the pipe 3, to thereby control the exhaust gas flow rate.

3. Third Embodiment

[3-1. Configuration of Valve Device]

In the first embodiment, the configuration is exemplified in which the valve device 1 is provided inside the pipe 3. In a third embodiment, a description will be given of a valve device 201 arranged to close an entire end of the pipe 3.

As shown in FIGS. 7A, 7B and FIGS. 8A, 8B, the valve device 201 comprises a valve seat 211, a valve body 213, a rotation shaft 217, and a spring 219. The valve seat 211 is mounted to the pipe 3 and has an opening through which exhaust gas passes. The valve body 213 has one end to which the rotation shaft 217 is coupled. The valve body 213 is rotationally displaceable about the rotation shaft 217, and is configured to close the aforementioned opening of the valve seat 211 when approaching the valve seat 211.

The valve body 213 is configured to be rotationally displaceable about the rotation shaft 217 between a closed position (see FIG. 7A) with a relatively high blocking degree of the pipe 3 by the valve body 213, and an open position (see FIG. 7B and FIG. 8A) with a relatively low blocking degree.

The valve body 213 comprises an upstream wall 221 configured to close the opening of the valve seat 211, and a gas receiving portion 223 arranged at an end of the valve body 213 opposite to a position where the rotation shaft 217 is provided. The upstream wall 221 is a portion arranged in a position upstream of the rotation shaft 217 in the flow direction when the valve body 213 is in the closed position. The gas receiving portion 223 is provided on an opposite side of the valve body 213 with respect to the rotation shaft 217. The gas receiving portion 223 is shaped such that the end of the valve body 213 opposite to the rotation shaft 217 is curved upstream, when the valve body 213 is in the closed position. The end provided with the gas receiving portion 223 is a rotation end that moves downstream in the flow direction of the fluid when the valve body 213 is displaced from the closed position toward the open position.

The spring 219 is arranged to be wound around the rotation shaft 217, and biases the valve body 213 toward a position to close the opening of the valve seat 211 (i.e., the closed position).

[3-2. Effects]

In the valve device 201 as described above, the upstream wall 221 is arranged in the position upstream of a rotation center provided by the rotation shaft 217 when the valve body 213 is in the closed position. In addition, the rotation end of the gas receiving portion 223 projects upstream. Thus, similarly to the valve device 1 described above, it is possible to receive the force from the exhaust gas efficiently when the valve body 213 is displaced from the closed position toward the open position. Accordingly, it is facilitated to maintain a large opening degree of the valve device 201, thereby achieving a further reduced exhaust pressure.

Figure 8A:
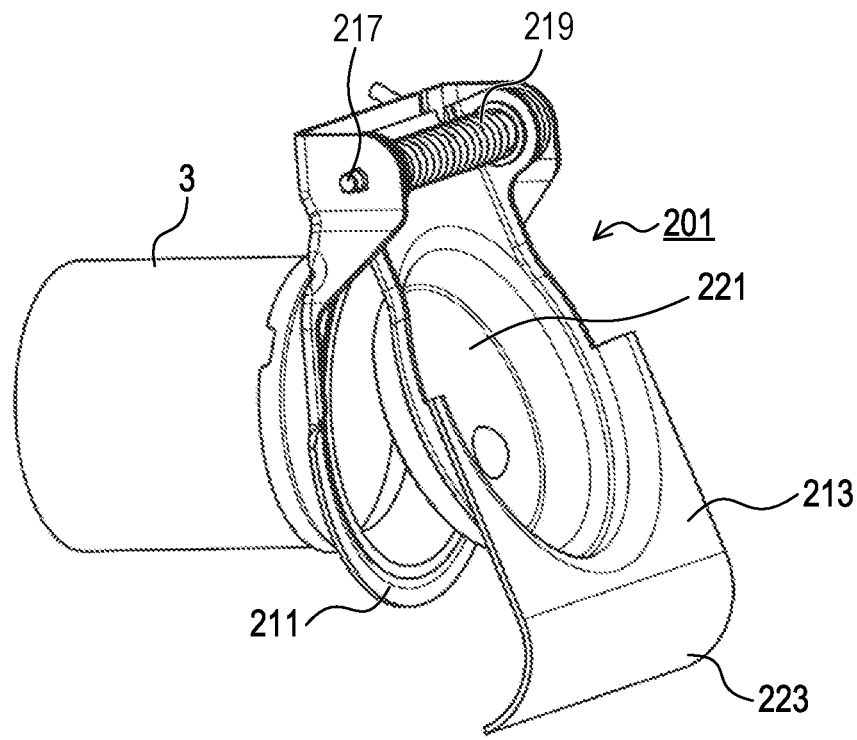
FIG. 8A is a perspective view showing the valve device of the third embodiment.
Figure 8B:
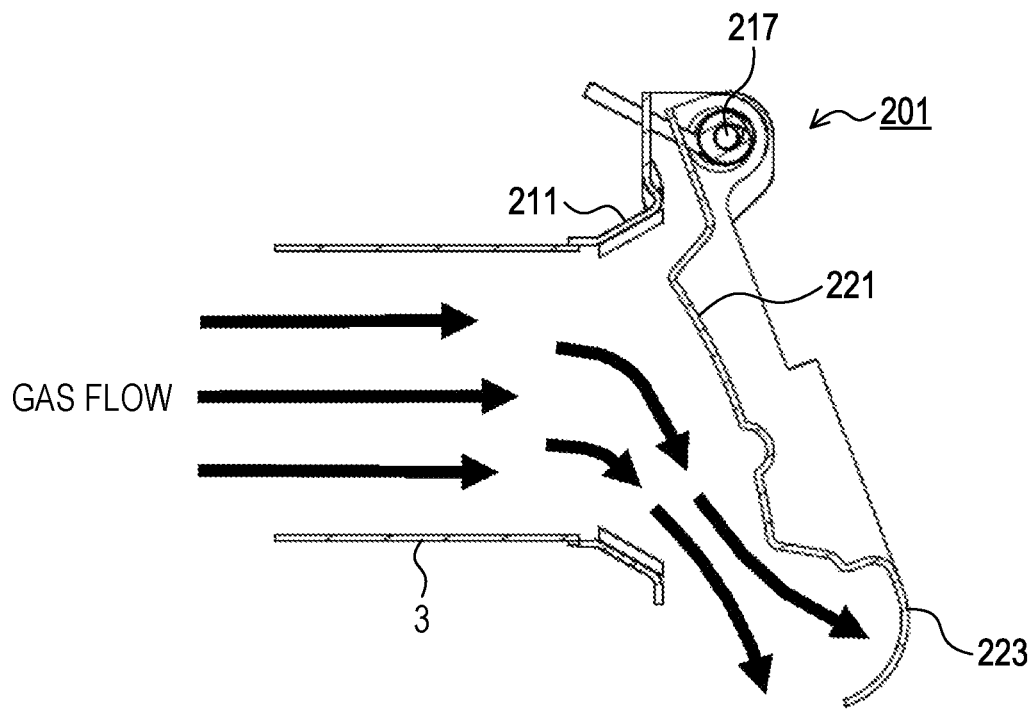
FIG. 8B is a sectional view of the valve device of the third embodiment.

As indicated by arrows in FIG. 8B, most of the exhaust gas discharged from the pipe 3 flows toward the gas receiving portion 223. Thus, the gas receiving portion 223 can receive strong pressure of the exhaust gas, thus allowing the valve body 213 to receive a large rotational force in the opening direction from the exhaust gas.

4. Other Embodiments

Although some embodiments of the present disclosure have been described above, the present disclosure is not at all limited to the above-described embodiments, but may be in various forms within the technical scope of the present disclosure.

Figure 9:
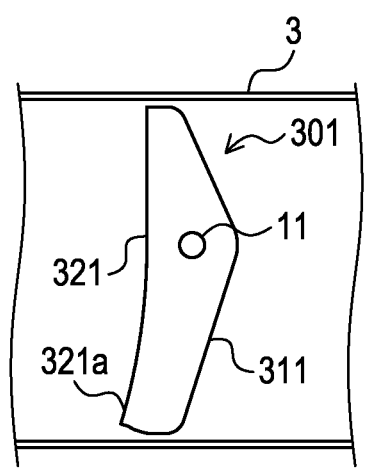
FIG. 9 is a side view showing a modified example of the valve device.

(4a) The valve body of the present disclosure is not limited to any particular configuration, but may have any configuration that comprises at least an upstream wall offset from a rotation shaft and a rotation end projecting (curved) upstream. For example, the valve body may have a hollow interior. In this case, a valve body 311 may be formed as a single component as in a valve device 301 shown in FIG. 9. In this configuration, a rotation end 321a of an upstream wall 321 to be positioned upstream when the valve body 311 is in the closed position may have a shape curved upstream. The valve body 311 can serve the same function as the valve body 19 of the valve device 1.

Figure 10:
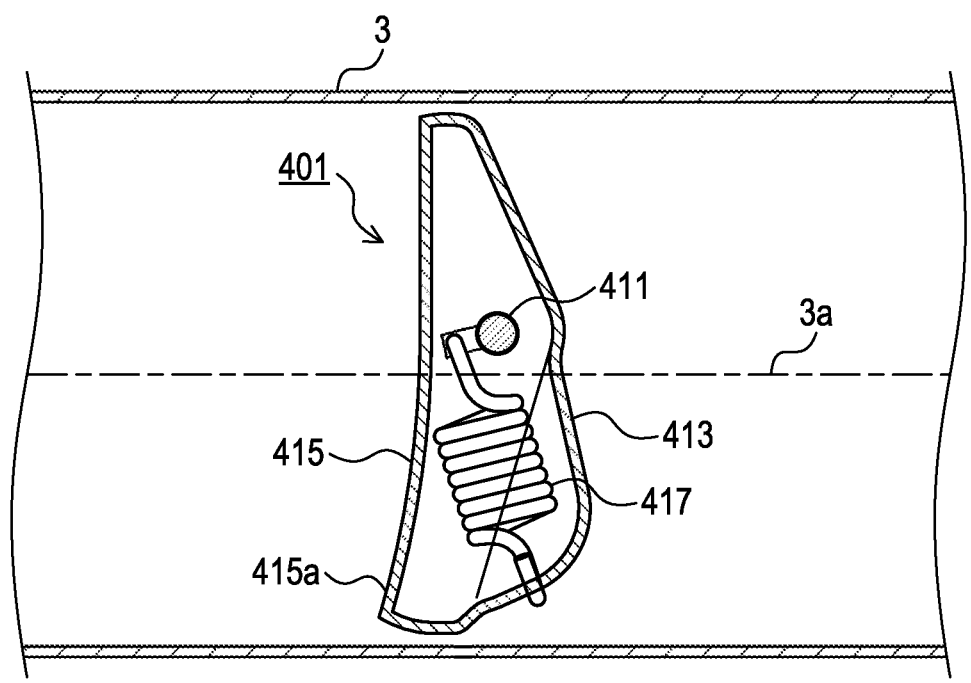
FIG. 10 is a sectional view showing a modified example of the valve device.

(4b) The first embodiment shows an example configuration where the biasing portion 17 is arranged outside the pipe 3. Alternatively, a biasing portion may be arranged inside the pipe 3. As in a valve device 401 shown in FIG. 10, a biasing portion 417 may be arranged inside a hollow valve body 413. The valve body 413 comprises an upstream wall 415 and a rotation end 415a. The biasing portion 417 in the valve device 401 is a coil spring. The biasing portion 417 has one end coupled to a rotation shaft 411 and the other end coupled to the valve body 413. The biasing portion 417 having such configuration is rotationally displaced in accordance with rotation of the valve body 413. In the valve device 401, the rotation shaft 411 is non-rotatably fixed to the pipe 3. The rotation shaft 411 may be directly fixed to the pipe 3, or may be indirectly fixed through one or more components.

(4c) The upstream wall is not limited to any particular configuration, but may have any configuration that is arranged upstream of the rotation center by the rotation shaft 11 in the flow direction of the fluid. For example, the upstream surface may have a curved shape though the first embodiment shows an example configuration where the portion 13b of the upstream wall 13 on an opposite end side to the rotation end 13a has a flat-shaped upstream surface.

(4d) The rotation shaft may be arranged to intersect the central axis 3a though the first to third embodiments each show a configuration where the rotation shaft is arranged in a position spaced apart from the central axis 3a of the exhaust flow path. In this case, a configuration of the valve body and settings of the space 5 may be adjusted to generate torque in the opening direction on the valve body in the closed position when the exhaust gas flows.

Figure 11:
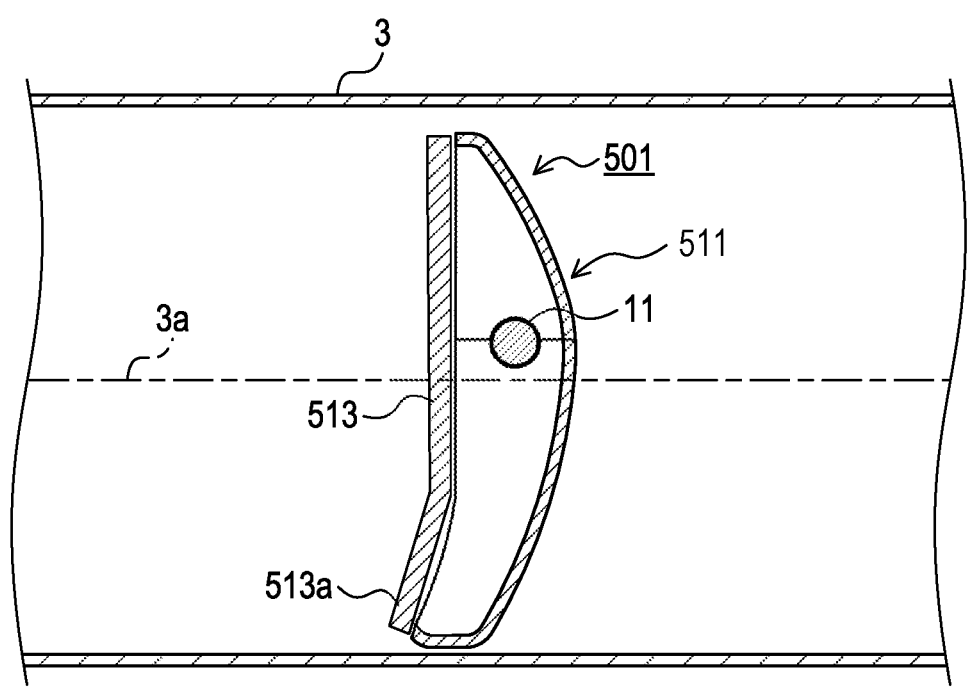
FIG. 11 is a sectional view showing a modified example of the valve device.

(4e) The first embodiment and the second embodiment each show an example configuration where the rotation end 13a in the upstream wall is gently curved upstream. However, the rotation end is not limited to any particular configuration, but may have any configuration that projects upstream when the valve body is in the closed position. For example, as a valve body 511 in a valve device 501 shown in FIG. 11, a part of an upstream wall 513 may be bent to thereby form a rotation end 513a that is curved upstream.

(4f) A plurality of functions performed by a single element in the aforementioned embodiments may be achieved by a plurality of elements, or a function performed by a single element may be achieved by a plurality of elements. A plurality of functions performed by a plurality of elements may be achieved by a single element, or a function performed by a plurality of elements may be achieved by a single element. A part of a configuration in the aforementioned embodiments may be omitted. At least a part of a configuration in the aforementioned embodiments may be added to, or may replace, another configuration in the aforementioned embodiments.

What is claimed is:

1. A valve device to be arranged in a pipe through which a fluid flows, the valve device comprising:
   a rotation shaft;
   a valve body configured to be rotationally displaceable about the rotation shaft between a closed position in which a blocking degree of the pipe by the valve body is relatively large, and an open position in which the blocking degree is relatively small; and
   a biasing portion biasing the valve body so as to cause the valve body to approach the closed position,
   wherein the valve body comprises an upstream wall arranged in a position upstream of the rotation shaft in a flow direction of the fluid when the valve body is in the closed position, wherein the valve body comprises a rotation end, which is an end distal from the rotation shaft and is configured to move downstream in the flow direction of the fluid in response to a displacement of the valve body from the closed position to the open position, and the rotation end is shaped to project upstream when the valve body is in the closed position, wherein the rotation end of the valve body is located in the upstream wall, wherein a portion in the upstream wall located closer to an opposite end to the rotation end comprises a surface facing upstream, the surface being configured to be located downstream of the rotation end when the valve body is in the closed position, and wherein the rotation shaft is arranged in a position between the rotation end and the opposite end to the rotation end in a radial direction of the pipe, the position of the rotation shaft being spaced from a central axis of the pipe in the radial direction.

2. The valve device according to claim 1, wherein the surface of the portion of the upstream wall that is located on the opposite end to the rotation end comprises a flat-shaped surface configured to face upstream when the valve body is in the closed position.

3. The valve device according to claim 2, wherein the upstream wall is configured such that the rotation end and the rotation shaft are located opposite to each other with respect to the central axis of the pipe when the valve body is in the closed position.

4. The valve device according to claim 3, wherein the rotation shaft is non-rotatably fixed directly or indirectly to the pipe, and wherein the biasing portion is a spring member biasing the valve body by an elastic force, the biasing portion being arranged inside the pipe and having one end coupled to the rotation shaft and the other end coupled to the valve body.

5. The valve device according to claim 2, wherein the rotation shaft is non-rotatably fixed directly or indirectly to the pipe, and wherein the biasing portion is a spring member biasing the valve body by an elastic force, the biasing portion being arranged inside the pipe and having one end coupled to the rotation shaft and the other end coupled to the valve body.

6. The valve device according to claim 1, wherein the rotation shaft is non-rotatably fixed directly or indirectly to the pipe, and wherein the biasing portion is a spring member biasing the valve body by an elastic force, the biasing portion being arranged inside the pipe and having one end coupled to the rotation shaft and the other end coupled to the valve body.

\* \* \* \* \*